Patented June 18, 1940

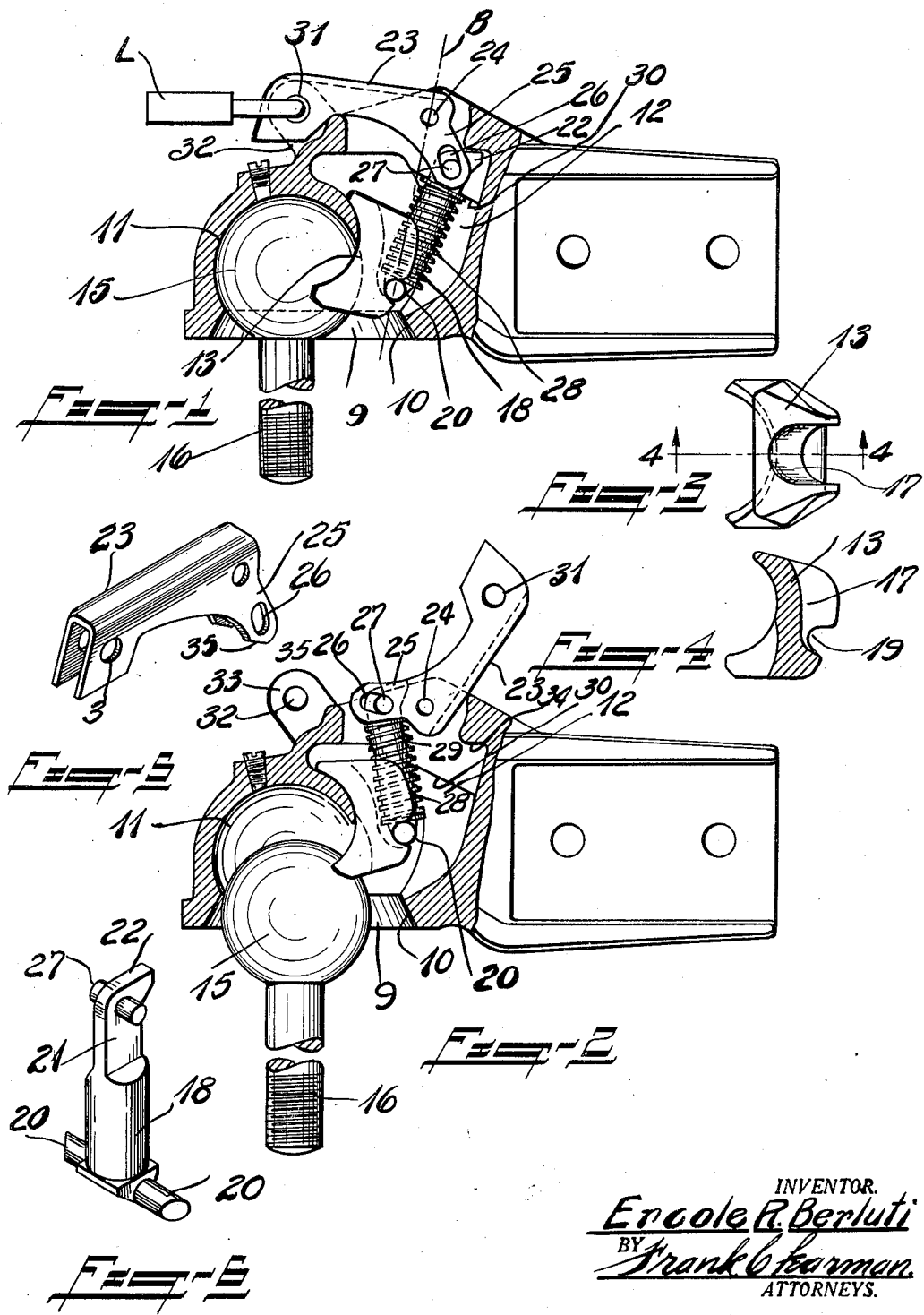

2,204,882

UNITED STATES PATENT OFFICE 2,204,882

TRAILER HITCH

Ercole R. Berluti, Saginaw, Mich.

Application January 21, 1939, Serial No. 252,073

9 Claims. (Cl. 280—33.17)

This invention relates to hitches of the ball and socket type such as used in connection with the towing of house trailers by automobiles, tractor trailers and/or similar commercial combinations.

One of the prime objects of the invention is to provide readily operable means for locking the ball in the socket and/or holding said locking means in unlocked position to permit free and easy removal or uncoupling of the ball from the socket and without danger to the operator's hands.

Another object is to provide a radially movable locking member including yieldable means for exerting constant pressure against the ball to eliminate rattle or chattering when the vehicle travels over rough and uneven roads.

A further object is to provide a hitch having a lever actuated locking means movable to locked or unlocked position, including means for exerting a yielding pressure against the ball when the member is in locked position, said means also assisting in holding the locking member in its unlocked position.

A still further object is to design a hitch composed of few parts, which is simple, easy and economical to manufacture and assemble, and in which the coupling parts are positively locked against release excepting by manual manipulation of the locking lever by the operator.

The above and other objects will appear as the specification progresses, reference being had to the accompanying drawing in which I have shown one embodiment of my invention and in which like numerals indicate like parts throughout the several views thereof.

In the drawing:

Fig. 1 is a part sectional side elevational view of my trailer hitch showing the ball locked in the socket.

Fig. 2 is a view similar to Fig. 1 and showing the mechanism in unlocked position.

Fig. 3 is a top plan view of the locking member.

Fig. 4 is a section taken on the line 4—4 of Fig. 3.

Fig. 5 is an isometric view of the locking lever.

Fig. 6 is an isometric view of the link which connects the ball engaging member and the locking lever.

Referring now more specifically to the drawing in which I have shown one embodiment of my invention, the numeral 8 indicates a suitable casting provided with a circular opening 9 beveled as at 10 to facilitate access to the spherical socket 11 provided therein. A chamber 12 is provided in this casting 8 and communicates with the socket 11 as shown, said chamber accommodating a ball engaging member 13 which is shaped as more clearly shown in Figs. 3 and 4 of the drawing, the one face 14 being concavely formed to engage the head 15 of the ball bolt 16 and form a continuance of the spherical contour of the socket 11, the opposite face having a vertically disposed, grooved section 17 adapted to freely accommodate a link member 18 which is associated therewith. Horizontally disposed sockets 19 are provided in the side walls which define the groove 17 of the ball engaging member 13 and accommodate the laterally projecting ends 20 of the link 18, said link being tubular in shape with its upper end flatted as at 21, the extreme end being bill-shaped as at 22, and for a purpose to be presently described.

A locking lever 23 is pivotally mounted on the member 8 by means of the pin 24, and is formed with a projecting leg 25 having a slotted opening 26 therein, a pin 27 serving to pivotally connect the link 18 and the leg 24 of the locking lever 23. A spring 28 is mounted on this link 18 and is interposed between the arms 20 and a washer 29, which is provided on the upper end of the link 18, said washer bearing against the leg 25 of the locking lever 23 when it is in raised position, and aiding in holding said lever in raised, unlocked position.

Shoulders 30 are provided in the chamber 12 as shown, and the washer 29 engages said shoulder when the ball is in locked position so that a yielding pressure is exerted on the ball when the mechanism is locked.

An opening 31 is provided adjacent the outer end of the locking lever 23, said opening registering with a similar opening 32 provided in the lug 33, which is formed integral with the casting 8, and when the locking lever is swung down to position shown in Fig. 1 of the drawing, these openings will be in alignment so that the hasp of a conventional lock L can be inserted therethrough to lock the ball in the socket and prevent theft and/or unauthorized manipulation of the hitch.

When the mechanism is in position shown in Fig. 2 of the drawing, the ball 15 is freely insertable in or removable from the socket 11, then when it is desired to lock the hitch, the operator swings the locking lever 23 forwardly, forcing the ball engaging member 13 downwardly and into engagement with the ball and the bill-shaped end 22 of the lever 18 past a center line B, drawn through the centus of the bearings 19 and 24 respectively, (see Fig. 1) and until said bill-shaped end is positioned directly beneath the shoulder 34. This swinging movement of the lever compresses the spring 28, while the washer 29 moves into position to bear against the shoulders 30; continued movement brings the flatted ends 35 of the lever over the spring, thus releasing the lever of any spring pressure.

This arrangement provides for a constant pressure against the ball 15 to prevent chattering or noise; while the link 18 prevents any upward movement of the ball engaging member, should for any reason an upward pressure on the ball engaging member overcome the downward pressure of the spring.

I wish to direct particular attention to the fact that the spring 28 is compressed when the mechanism is locked, and that the hitch cannot be unlocked until the locking lever is actuated.

The structure can be easily and economically manufactured, it can be positively locked, and it is not necessary for the operator to closely approach the coupling to make the connection.

What I claim is:

1. A trailer hitch of the class described having in combination a ball, a socket member having a ball receiving opening therein, a chamber adjacent to and open to said socket, said chamber extending a predetermined distance around said socket to form a slideway, and a peripherically movable ball engageable member movable on said slideway to position to restrict said ball receiving opening and positively lock the ball in the socket and to be retracted to permit removal of said ball.

2. A trailer hitch comprising in combination, a ball member, a socket device having a spherical ball socket therein, a chamber open to said ball socket, a radially movable ball engaging member in said chamber and slidable peripherically on said socket to position to securely lock the ball in the socket, a locking lever on the socket device, and a link connected to said ball engaging member and locking lever for sliding said ball engaging member to locked and retracted position when the locking lever is actuated.

3. A trailer hitch comprising in combination, a ball member, a socket device having a spherical shaped socket therein, a chamber open to said spherical opening, a peripherically slidable wall mounted in said chamber and slidable to position to form a portion of the wall of the spherical shaped socket and to lock the ball member in the socket, a locking lever pivotally mounted on the device and provided with a projecting leg, and a link member connected to said leg and wall member for moving said wall to locked and retracted position.

4. A trailer hitch comprising in combination, a ball member, a socket member having a ball receiving opening therein, a chamber adjacent said socket and open thereto, a ball engaging member in said chamber and mounted to slide peripherically position to form a continuation of the socket to lock the ball therein, and retractable to permit entry of the ball to the socket, a locking lever on the socket member, a link connected to the ball engaging member and to said locking member, and a shoulder in said chamber adapted for engagement by the upper end of the link to positively lock said ball member in the socket.

5. A trailer hitch comprising a ball member, an attaching member having a spherical shaped ball receiving socket therein, a chamber adjacent and open to said socket, a ball engaging wall section mounted in said chamber and movable to position to lock the ball in the socket, a locking lever on said attaching member, a link connected thereto and to the ball engaging wall section, and a shoulder in said chamber at a point horizontally removed from the pivoting point of the locking lever and engageable by the upper end of the link for locking the ball in the socket when the link is shifted to predetermined locked position.

6. A trailer hitch comprising in combination a ball member, an attaching member formed with a spherical shaped ball receiving socket therein, a chamber in said member and open to said socket, a ball engaging member loosely mounted in said chamber and slidable peripherically to position to lock said ball in said socket, a locking lever on the attachment, a link connected to said lever and to the ball engaging member, and resilient means on said link for exerting a yielding pressure against the ball engaging member when the mechanism is in locked position.

7. A trailer hitch comprising in combination a ball member, an attaching member formed with a spherical shaped socket therein, a chamber adjacent said socket, a movable ball engaging wall forming a part of the wall of the socket when in certain predetermined locked position, a manually actuated locking lever formed with an off-set depending leg, a slotted opening therein, a link connected to said leg opening and to the ball engaging wall, a bill-shaped extension on the link, a shoulder in the chamber and adapted to limit the upward movement of the link when said leg extension is in alignment with said shoulder, and resilient means associated with said link for exerting a constant pressure against said ball engaging member when the mechanism is in locked position.

8. A trailer hitch comprising in combination a ball member, an attaching member formed with a spherical shaped ball receiving socket therein, a chamber adjacent said socket and opening thereinto, a ball engaging member mounted in said chamber and movable to position to lock said ball in the socket, a locking lever on the attachment, a link pivotally connected thereto and to the ball engaging member, a washer on said link, resilient means interposed between the washer and the lower end of said link, and a shoulder in said chamber adapted to be engaged by said washer for yieldingly forcing said ball engaging member against the ball when the hitch is in locked position.

9. A trailer hitch comprising in combination, a ball member having a head and reduced neck, a ball receiving member having a spherical-shaped socket and a beveled opening, a chamber open to and partially surrounding said socket, a ball engaging member mounted to slide peripherically with relation to said ball member, a link loosely connected to said ball engaging member, a locking lever pivotally mounted on said ball receiving member at a point intermediate its length with the end pivotally connected to the upper end of said link, said link being adapted when actuated to shift said ball engaging member to either locked or retracted position with relation to said ball member.

ERCOLE R. BERLUTI.